United States Patent
Ebert et al.

(10) Patent No.: US 6,497,297 B1
(45) Date of Patent: Dec. 24, 2002

(54) METHOD FOR INTEGRATED REPRESENTATION OF THE PARAMETERS OF A DISTANCE CONTROL DEVICE

(75) Inventors: Holger Ebert, Nuremberg; Matthias Heimermann, Wolfenbuettel; Ingo Boeckmann, Ribbesbuettel, all of (DE)

(73) Assignee: Volkswagon AG, Wolfsburg/Fallersleben (DE)

(*) Notice: Subject to any disclaimer, the term of this patent is extended or adjusted under 35 U.S.C. 154(b) by 0 days.

(21) Appl. No.: 09/807,493

(22) PCT Filed: Sep. 3, 1999

(86) PCT No.: PCT/EP99/06477

§ 371 (c)(1),
(2), (4) Date: Apr. 13, 2001

(87) PCT Pub. No.: WO00/21773

PCT Pub. Date: Apr. 20, 2000

(30) Foreign Application Priority Data

Oct. 15, 1998 (DE) .......................................... 198 47 611

(51) Int. Cl.$^7$ .................................................. B60K 31/00
(52) U.S. Cl. ...................... 180/170; 701/119; 340/903
(58) Field of Search .............................. 180/170, 171, 180/167, 168, 169; 701/93, 96, 116, 117, 118, 119; 340/901, 902, 903; 342/357.01, 357.08

(56) References Cited

U.S. PATENT DOCUMENTS

| | | | |
|---|---|---|---|
| 5,161,632 A | | 11/1992 | Asayama |
| 5,197,562 A | * | 3/1993 | Kakinami et al. ........... 180/169 |
| 5,230,400 A | | 7/1993 | Kakinami et al. |
| 5,369,590 A | * | 11/1994 | Karasudani ................. 701/300 |
| 5,410,304 A | | 4/1995 | Horst et al. |
| 5,612,686 A | * | 3/1997 | Takano et al. .............. 340/903 |
| 5,670,935 A | * | 9/1997 | Schofield et al. ........... 340/903 |
| 5,949,331 A | * | 9/1999 | Schofield et al. ........... 340/461 |
| 6,289,278 B1 | * | 9/2001 | Endo et al. ................. 701/208 |
| 6,373,400 B1 | * | 4/2002 | Fujita et al. ................ 340/901 |

FOREIGN PATENT DOCUMENTS

| | | |
|---|---|---|
| DE | 195 39 799 | 5/1996 |
| EP | 0 876 936 | 11/1998 |
| JP | 05124459 | 5/1993 |
| JP | 6324147 | * 11/1994 |
| JP | 07117523 | 5/1995 |
| JP | 08192663 | 7/1996 |

OTHER PUBLICATIONS

Winner, Hermann et al., "Adaptive Cruise Control System Aspects and Development Trends", SAE Technical Paper 961010, 1996, pp. 27–36.

* cited by examiner

Primary Examiner—Brian L. Johnson
Assistant Examiner—Bryan Fischmann
(74) Attorney, Agent, or Firm—Kenyon & Kenyon

(57) ABSTRACT

A method for integrated representation of the parameters of an adaptive cruise control device includes the steps of: (a) alphanumerically representing a set, desired speed on a pictorial horizon of the display device; (b) pictographically representing a motor vehicle if a distance sensor group has detected a motor vehicle driving ahead; (c) alphanumerically representing a detected speed of the motor vehicle within the pictographic representation and in accordance with the representing step (b) if the detected speed is less than the set, desired speed; and (d) symbolically representing a traffic lane, a dynamic bar being displayed in the traffic lane, a length of the dynamic bar symbolizing the position relative to the motor vehicle.

26 Claims, 2 Drawing Sheets

METHOD FOR INTEGRATED REPRESENTATION OF THE PARAMETERS OF A DISTANCE CONTROL DEVICE

FIELD OF THE INVENTION

The present invention relates to a method for integrated display of the parameters of an adaptive cruise control device.

BACKGROUND INFORMATION

Adaptive cruise control devices generally include a distance sensor group, an evaluation unit, an input and output unit, and a control device. In such devices, a desired speed can be set via the input unit, the desired speed being set and retained by the control device, if the traffic so permits. Therefore, a constant traveling speed can be set very easily by use of such a cruise control system. However, the traffic density does not always allow the set, desired speed to be maintained. If there is traffic driving ahead, an adaptive cruise control device helps to automatically maintain a certain safe distance. This legally stipulated safety or trailing distance is a function of the speed, so that a speed-dependent trailing time is also frequently used. To that end, the distance of a motor vehicle driving ahead is determined from the propagation delay of emitted signals, by use of the distance sensor group. Then, the speed can be determined by either a differential measurement or directly from the Doppler shift. Since not every motor vehicle driver wants to drive with the same trailing distance, newer adaptive cruise control devices allow a trailing distance to be set inside a certain range. For the information of the motor vehicle driver, all of these set parameters and detected parameters must now be represented on an output unit designed as a display.

For example, such a display for representing various parameters is described, for example, in German Published Patent Application No. 195 39 799, where a detected motor vehicle is represented in the form of a pictograph. The size of the pictograph becomes larger with decreasing distance in order to visually emphasize the approach. The set, desired speed, the actual speed, and the speed of the detected motor vehicle are represented in an integrated bar chart by a graphical display. A disadvantage of this type of display of parameters is that a certain degree of abstraction is required, which makes it more difficult for the driver to obtain a quick overview of the current control situation.

Therefore, the present invention is based on the engineering problem of providing a method for the integrated display of the parameters of an adaptive cruise control device, by which the parameters can be displayed so that the parameters may be determined quickly and easily by the motor vehicle driver, based on the stress resulting from normal driving.

SUMMARY

According to the present invention, the set, desired speed is initially represented alphanumerically on the pictorial horizon of the display. In addition, a detected motor vehicle driving ahead is represented in the form of a pictograph. The speed of the motor vehicle is alphanumerically displayed in its pictographic representation, in case this is less than the set, desired speed. The traffic lane, in which the vehicle in question and the vehicle driving ahead are located, is also represented symbolically. A dynamic bar, the length of which symbolizes the position relative to the control target, is disposed inside this lane. This results in an integrated display of all parameters, which graphically symbolizes the control correlations from the perspective of the driver. Furthermore, the dynamic bar disposed inside the traffic lane allows a quick tendency estimation, from which the control interrelationships can be determined quickly and easily, so that critical situations can be recognized sooner and so that one can appropriately react early.

DETAILED DESCRIPTION

Figure 1:
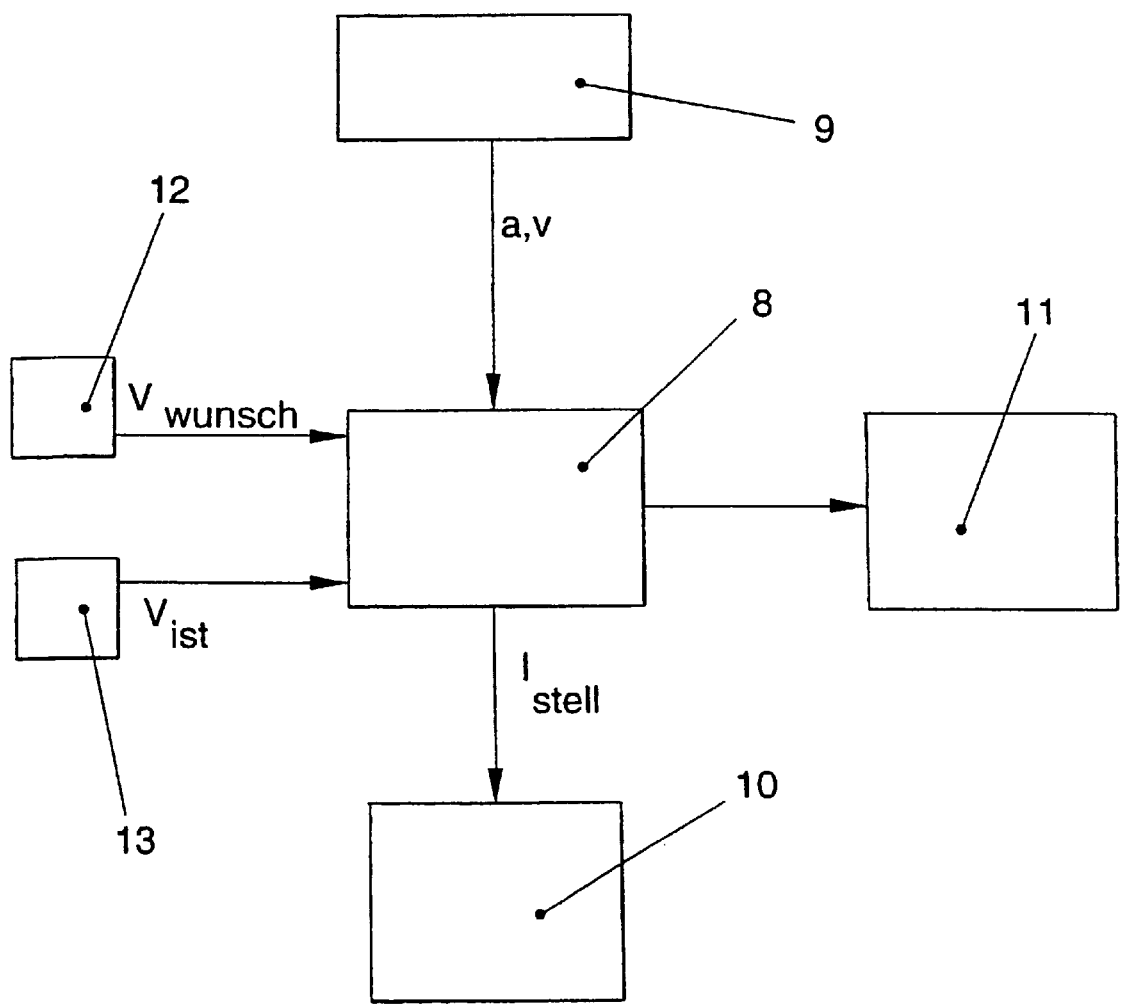
FIG. 1 is a schematic block diagram of an adaptive cruise control device.

FIG. 1 shows a schematic block diagram of an adaptive cruise control device, which includes: at least one control unit 8; a device 9 for determining the distance between a motor vehicle driving ahead and the motor vehicle in question, and for determining the speed of the vehicle driving ahead; at least one device 10 for controlling the speed of the motor vehicle in question; a display device 11 for displaying the parameters of the adaptive cruise control system; an input device 12 for inputting the desired speed specifiable by the vehicle driver; and a device 13 for determining the current speed of the vehicle in question. To activate the cruise control or adaptive cruise control, the vehicle driver inputs a desired speed, $v_{Wunsch}$, via input device 12. If no object or motor vehicle in front of the vehicle in question is detected by device 9, control device 8 forms an actuating signal $I_{Stell}$ for device 10 for controlling the speed, in order to adjust the actual speed $v_{ist}$ to the desired speed. Desired speed $V_{Wunsch}$ then constitutes the setpoint speed. In this case, only the driving engine of the motor vehicle is considered by device 10 for controlling the speed.

Figure 3:
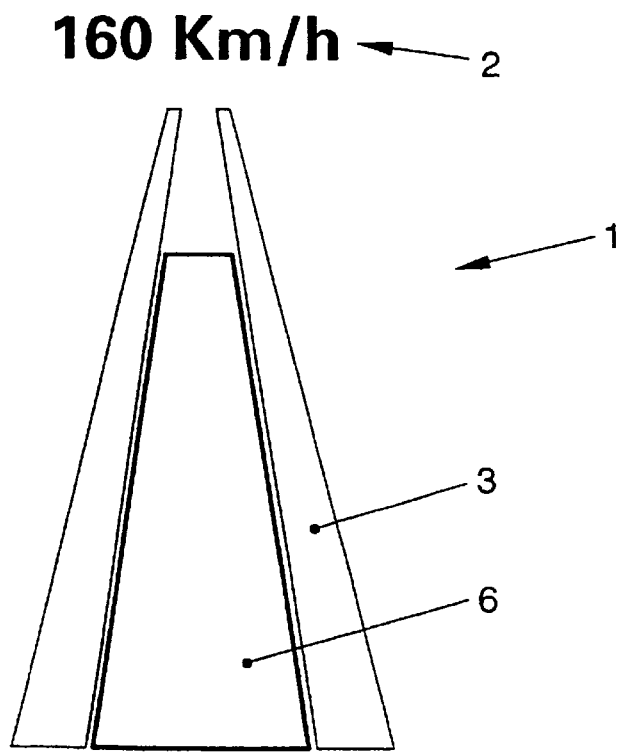
FIG. 3 illustrates the display during cruise control.

For example, a representation shown in FIG. 3 appears on display device 11.

If there is a vehicle in front of the motor vehicle in question, device 9 ascertains its distance a to the vehicle in question, as well as its speed v, and transmits these data to control unit 8. Control unit 8 calculates an actuating variable $I_{Stell}$ for device 10 for controlling the speed, as a function of both the data received from device 9 and the current actual speed $v_{ist}$ of the vehicle in question. In this case, both the motor-vehicle driving engine and a braking device may be used by device 10. A representation shown in FIG. 2 appears on display device 11.

Figure 2:
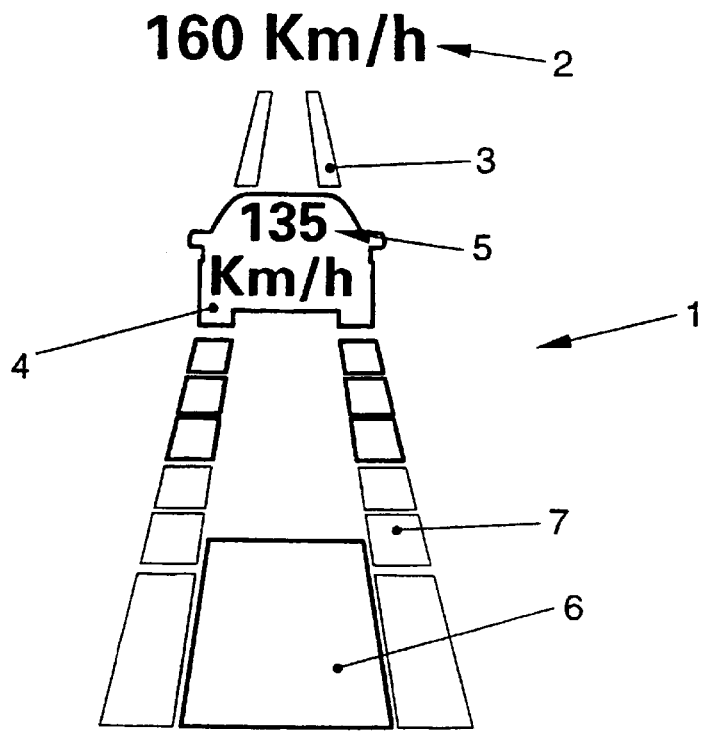
FIG. 2 illustrates a display during an active adaptive cruise control.

FIG. 2 shows an example of a display representation 1 in the case of an active adaptive cruise control. Display representation 1 includes an alphanumerically displayed, desired speed 2 of 160 km/h, which is centrally positioned in the upper region of display representation 1. A symbolic traffic lane 3 is displayed in perspective along nearly the entire height of display representation 1, so that desired speed 2 is symbolically positioned on the horizon of traffic lane 3. A pictographic vehicle 4 is arranged on traffic lane 3, speed 5 of the vehicle being alphanumerically positioned in pictographic motor vehicle 4. In addition, a dynamic bar 6 representing the position relative to a control target is arranged inside traffic lane 3. In front of motor vehicle 4, traffic lane 3 is subdivided into five segments 7, which each represent an adjustable trailing distance. The trailing distance currently set may be highlighted graphically or with color. In the given exemplary embodiment, this is represented by the first three segments 7. Therefore, the present control situation can easily be determined at a glance, using the display representation shown in FIG. 2; the present control situation being, namely, that a vehicle having a speed less than desired speed 2 was detected, an approximately mean trailing distance was set, and the vehicle is presently at a larger distance than the set trailing distance. In addition, the current control target, i.e., motor vehicle 4 in the exemplary embodiment, may be highlighted with color. Thus, if, for example, the detected motor vehicle changes lanes, then display representation 1 changes from adaptive cruise control mode to cruise control mode, which is represented in FIG. 3.

Since no additional motor vehicle is detected, pictographic vehicle 4 disappears. And since no trailing distance has to be maintained, the entire traffic lane 3 is represented, and the current control target, namely desired speed 2, is highlighted in color. Then, the length of dynamic bar 6 in relation to the represented length of the traffic lane symbolizes how large the current speed is in relation to the control target, desired speed 2.

What is claimed is:

1. A method for displaying parameters of an adaptive cruise control device, the cruise control device including a display device, the method comprising the steps of:
    (a) alphanumerically representing a set, desired speed on a pictorial horizon of the display device;
    (b) pictographically representing a motor vehicle if a distance sensor has detected a motor vehicle driving ahead;
    (c) alphanumerically representing a detected speed of the motor vehicle within the pictographic representation and in accordance with the representing step (b) if the detected speed is less than the set, desired speed; and
    (d) symbolically representing a traffic lane, a dynamic bar being displayed in the traffic lane, a length of the dynamic bar symbolizing the position relative to the motor vehicle.

2. The method according to claim 1, wherein the symbolic representation of the traffic lane relative to the detected motor vehicle inside of an adjustable trailing-distance range is subdivided into segments and wherein a set trailing distance is graphically displayed relative to the motor vehicle.

3. The method according to claim 1, wherein each of the displayed parameters is distinguishable by color.

4. The method according to claim 1, wherein the motor vehicle is highlighted in color.

5. The method according to claim 1, wherein the motor vehicle is highlighted graphically.

6. A method for displaying parameters of a combined distance and speed control system, comprising the steps of:
    alphanumerically representing a set, desired speed on a pictoral horizon of a display;
    pictographically representing a vehicle if a sensor system of an adaptive cruise control device has detected a vehicle driving ahead; and
    symbolically representing a traffic lane having a dynamic bar indicating a position relative to the vehicle driving ahead.

7. The method according to claim 6, wherein a length of the dynamic bar indicates the position relative to the vehicle driving ahead.

8. The method according to claim 6, wherein the pictographically representing step includes the substep of representing a speed of the detected vehicle driving ahead within the pictographic representation of the detected vehicle driving ahead.

9. The method according to claim 6, wherein the symbolically representing step includes the substeps of symbolically representing the traffic lane in a distance-control display in front of the pictographic representation of the detected vehicle driving ahead and subdividing the symbolic representation of the traffic lane into segments inside an adjustable range for a trailing distance.

10. The method according to claim 9, further comprising the steps of highlighting a currently set trailing distance one of graphically and in color.

11. The method according to claim 6, further comprising the step of setting off individual, displayed parameters from one another using color.

12. The method according to claim 6, further comprising the steps of highlighting the detected vehicle driving ahead at least one of in color and graphically.

13. A device for representing parameters of a combined distance and speed control system, comprising:
    an alphanumeric representation of a set, desired speed on a pictoral horizon of a display;
    a pictographic representation of a vehicle in accordance with a detection of a vehicle driving ahead by a sensor system of an adaptive cruise control deviced; and
    a symbolic representation of a traffic lane and a dynamic bar inside the traffic lane, the dynamic bar configured to indicate a position relative to the vehicle driving ahead.

14. The device according to claim 13, wherein the dynamic bar includes a length configured to indicate the position relative to the vehicle driving ahead.

15. A device according to claim 13, wherein the photographic representation includes a representation of a speed of the detected vehicle driving ahead inside the pictographic representation of the detected vehicle driving ahead.

16. The device according to claim 13, wherein, in a distance-control display, the symbolic representation of the traffic lane is in front of the pictographic representation of a detected vehicle and is subdivided into segments, inside an adjustable range for the trailing distance.

17. The device according to claim 16, wherein the symbolic representation of the traffic lane includes a currently set trailing distance highlighted one of graphically and in color.

18. The device according to claim 13, wherein individual, displayed parameters are set off from one another by color.

19. The device according to claim 13, wherein the pictographic representation of the detected veicle driving ahead is highlighted at least one of in color and graphically.

20. A device for representing parameters of a combined distance and speed control system, comprising:

a display configured to alphanumerically represent a set, desired speed on a pictoral horizon, configured to pictographically represent a vehicle in accordance with a detection of a vehicle driving ahead by a sensor system of an adaptive cruise control device, and to symbolically represent a traffic lane and a dynamic bar inside the traffic lane, the dynamic bar configured to indicate a position relative to the vehicle driving ahead.

21. The device according to claim 20, wherein a length of the dynamic bar is configured to indicate the position relative to the vehicle driving ahead.

22. The device according to claim 20, wherein the display is configured to represent a speed of the detected vehicle driving ahead inside the pictographic representation of the detected vehicle driving ahead.

23. The device according to claim 20, wherein the display is configured to symbolically represent the traffic lane in front of the pictographic representation of the detected vehicle driving ahead and to subdivide the symbolic representation of the traffic lane inside an adjustable range for a trailing distance.

24. The device according to claim 23, wherein the display device is configured to highlight one of graphically or in color a currently set trailing distance in the symbolic representation of the traffic lane.

25. The device according to claim 20, wherein the display device is configured to set off individual, displayed parameters from one another with color.

26. The device according to claim 20, wherein the display device is configured to highlight the pictographic representation of the detected vehicle driving ahead at least one of in color and graphically.

* * * * *

UNITED STATES PATENT AND TRADEMARK OFFICE
CERTIFICATE OF CORRECTION

PATENT NO.   : 6,497,297 B1
DATED        : December 24, 2002
INVENTOR(S)  : Holger Ebert, Matthias Heimermann and Ingo Boeckmann It is certified that error appears in the above-identified patent and that said Letters Patent is hereby corrected as shown below:

<u>Title page,</u>
Item [75], after "Ingo Boeckmann", please add -- Thomas Ruchatz, Lehre --.
Item [73], Assignee, should read -- Volkswagen AG, Wolfsburg Fallersleben, Germany --.

Signed and Sealed this

Twenty-ninth Day of July, 2003

JAMES E. ROGAN
*Director of the United States Patent and Trademark Office*